US007184177B2

(12) United States Patent
Trelewicz et al.

(10) Patent No.: US 7,184,177 B2
(45) Date of Patent: Feb. 27, 2007

(54) METHOD, APPARATUS AND ARTICLE OF MANUFACTURE FOR MODIFYING PRINTING BASED UPON DIRECT ON-THE-FLY MEDIA CHARACTERISTIC PARAMETERS

(75) Inventors: Jennifer Quirin Trelewicz, Superior, CO (US); Joan LaVerne Mitchell, Longmont, CO (US); Ravishankar Rao, Elmsford, NY (US); John B. Condon, Berthoud, CO (US); David Joseph Shields, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1076 days.

(21) Appl. No.: 09/990,150

(22) Filed: Nov. 21, 2001

(65) Prior Publication Data

US 2002/0186416 A1 Dec. 12, 2002

Related U.S. Application Data

(63) Continuation-in-part of application No. 09/876,507, filed on Jun. 6, 2001, now Pat. No. 7,085,014.

(51) Int. Cl.
*H04N 1/405* (2006.01)
(52) U.S. Cl. ............... 358/3.06; 358/3.13; 358/3.14; 347/101
(58) Field of Classification Search ............ 358/3.06, 358/3.13, 3.14, 3.21, 3.24, 487, 534, 535, 358/536; 347/101
See application file for complete search history.

(56) References Cited

U.S. PATENT DOCUMENTS

| 4,639,152 A | * | 1/1987 | Yamamoto et al. .... 400/120.08 |
| 4,835,573 A | | 5/1989 | Rohrer et al. |
| 4,869,101 A | | 9/1989 | Dvorsky |
| 4,966,455 A | * | 10/1990 | Avni et al. .................... 356/73 |
| 5,053,814 A | | 10/1991 | Takano et al. |

(Continued)

FOREIGN PATENT DOCUMENTS

JP          09286128 A      *  11/1997

(Continued)

OTHER PUBLICATIONS

Cojoc et al., "Surface Roughness Characterization of Printing Paper, By Fourier Spectrum Analysis", Photonics 95, European Optical Society Annual Meetings Digest Series, vol. 2A, Aug. 23-25, 1995, pp. 97-100.

(Continued)

*Primary Examiner*—Thomas D. Lee
(74) *Attorney, Agent, or Firm*—David W. Lynch; Chambliss, Bahner & Stophel PC

(57) ABSTRACT

A method, apparatus and article of manufacture for modifying printing based upon direct on-the-fly media characteristic parameters is disclosed. The present invention on-the-fly directly measures a media characteristic parameter and performs real-time print modification in response thereto. The measured characteristic parameters include paper texture and composition, as well as adhesion and penetration of print. The modification of print in response to these measured parameters may allow a customer to maintain observed print quality with lower-cost materials. Adjustments may include the addition of coating, hot rolling, or adjustment of toner concentration. Measured parameters may include mottle, paper texture, and bleed through.

63 Claims, 4 Drawing Sheets

U.S. PATENT DOCUMENTS

| | | | |
|---|---|---|---|
| 5,067,835 A | | 11/1991 | Yamamoto et al. |
| 5,282,001 A | | 1/1994 | Watson |
| 5,424,821 A | | 6/1995 | Sampath |
| 5,502,555 A | | 3/1996 | Lakatos |
| 5,684,707 A | | 11/1997 | Rogowski |
| 5,809,367 A | | 9/1998 | Yoo et al. |
| 5,974,160 A | | 10/1999 | Shiratori et al. |
| 5,983,044 A | * | 11/1999 | Kodama et al. ............... 399/49 |
| 6,067,406 A | | 5/2000 | Van Hoof et al. |
| 6,088,547 A | | 7/2000 | Martin et al. |
| 6,624,911 B1 | * | 9/2003 | Cooper et al. ............... 358/1.9 |

FOREIGN PATENT DOCUMENTS

| | | |
|---|---|---|
| SU | 239634 | 3/1964 |
| SU | 896407 | 8/1979 |
| SU | 918852 | 9/1979 |
| SU | 1024708 A | 4/1981 |

OTHER PUBLICATIONS

Huynh et al.,"A New Optical Method of Paper Roughness Measurement for Hard-Copy Devices", Society for Information Display International Symposium Digest of Technical Papers, vol. XVIII, May 12-14, 1987, pp. 271, 279-282.

"Printer Engine Customization by Media Type," IBM Corporation, Disclosure 432138, one page.

M. J. Stanich, "Print-quality Enhancement in Electrophotographic," IBM Corporation, R. D., vol. 41, No. 6, http://www.research.ibm.com/journal/rd/416/stanich.html.

M. J. Stanich, IBM Corporation, http://www.research.ibm.com/journal/rd/416/stani1.gif, 1 pg.

M. J. Stanich, IBM Corporation, http://www.research.ibm.com/journal/rd/416/stani2.gif, 1 pg.

M. J. Stanich, IBM Corporation, http://www.research.ibm.com/journal/rd/416/stani3.gif, 1 pg.

M. J. Stanich, IBM Corporation, http://www.research.ibm.com/journal/rd/416/stani4.gif, 1 pg.

M. J. Stanich, IBM Corporation, http://www.research.ibm.com/journal/rd/416/stani5.gif, 1 pg.

M. J. Stanich, IBM Corporation, http://www.research.ibm.com/journal/rd/416/stani6.gif, 1 pg.

M. J. Stanich, IBM Corporation, http://www.research.ibm.com/journal/rd/416/stani7.gif, 1 pg.

M. J. Stanich, IBM Corporation, http://www.research.ibm.com/journal/rd/416/stani8.gif, 1 pg.

M. J. Stanich, IBM Corporation, http://www.research.ibm.com/journal/rd/416/stani10.gif, 1 pg.

M. J. Stanich, IBM Corporation, http://www.research.ibm.com/journal/rd/416/stani11.gif, 1 pg.

* cited by examiner

METHOD, APPARATUS AND ARTICLE OF MANUFACTURE FOR MODIFYING PRINTING BASED UPON DIRECT ON-THE-FLY MEDIA CHARACTERISTIC PARAMETERS

REFERENCE TO RELATED APPLICATIONS

This is a continuation-in-part of U.S. patent application Ser. No. 09/876,507, filed Jun. 6, 2001, now U.S. Pat. No. 7,085,014, entitled METHOD, APPARATUS AND ARTICLE OF MANUFACTURE USING MEDIA ROUGHNESS AS A PRINT PARAMETER, which is assigned to the assignee of the present invention and which is incorporated by reference herein.

BACKGROUND OF THE INVENTION

1. Field of the Invention.

This invention relates in general to print output apparatus and methods, and more particularly to a method, apparatus and article of manufacture for modifying printing based upon direct on-the-fly media characteristic parameters.

2. Description of Related Art.

In electronic print devices for printing, copying and desktop publishing systems, images are usually offered in electronic form, and are then referred to as electronic images. These electronic images can be stored on magnetic disk or transported via direct links or networks to the print devices. The creation of a page results in an electronic data stream or electronic file describing the several elements of the page layout in electronic format. This electronic page layout is usually expressed in a page description language. The electronic page layout comprises the data for each electronic image that must appear on the printed reproduction.

In order to render images such as pictures, letters, and characters from input information, halftone screens are used to cause the illusion of continuous-tone pictures when the display or print device is capable of producing fewer levels than are specified by the image. For example, input images are divided into a number of very small cells (called picture elements herein below) arranged in matrix form and each of the printed images is obtained as a whole by using picture element reproduction elements, where each picture element reproduction element corresponds to at least one or more picture elements. In general, according to this method, in most cases, logic circuits such as digital integrated circuits are used in electric circuits driving picture element reproduction elements.

In such a printing device, each electronic gray level, which may be an eight-bit number, for example, having a value N between 0 and 255, is converted to a visual density on the hard copy. This density, D, is defined as the negative base ten logarithm of the portion of reflected or transmitted light from incident light on the hard copy. The relation between the gray level N and the density D is strongly dependent on the output device. In order to get the same reproduction from the same electronic page layout on different output devices, the gray level N is not fed directly to the printing device, but rather a stimulus value S is applied to the printing device. The stimulus value S is derived from the gray level N in such a manner that after transformation of the stimulus S to a density D by the printing device, a specific relation exists between the gray level N and the resulting density D. This is called linearization of the printing device, and is thus achieved by establishing a device specific relation between the gray level N and the device stimulus S. This relation is referred to as a tone curve or a transfer function.

It is known in the art that most printing devices have a device specific transfer function incorporated, which is obtained by calibration. Each time when electronic images are printed on this device, the same device specific transfer function is applied to the gray levels of the electronic image.

Problems arise when the output mode of the output device changes without a corresponding change in print parameters. One output device can for example render electronic images on an output medium. The term medium or media indicates the physical material on which the output appears. Printers require reasonably high quality media in order to achieve high quality printing. As applied to paper, "print quality" is an assessment of at least one particular paper characteristic parameter. There are many influential objective factors bearing upon the print quality of print media.

There have been suggestions to consider characteristics of print media to optimize printing. For example, U.S. Pat. No. 4,835,573 issued May 30, 1989 to Charles Rohrer et al., which is assigned to International Business Machines Corporation, the assignee of the present invention, discloses using processing elements, such as microcode, to count the number of cut sheets fed from a supply bin and also to monitor the amount of bin travel. The data obtained is then used to estimate sheet thickness and weights to adjust machine operating elements which are sensitive to supply sheet quality parameters. However, actual media characteristic parameters are not directly measured on-the-fly.

U.S. Pat. No. 6,088,547 issued Jul. 11, 2000 to Michael Martin et al., which is assigned to Hewlett-Packard Company, suggests measuring a sympathetic response induced by the vibrating print media as it advances through the paper path. Sensors measure the vibration and associate the magnitude of vibration with the roughness of the paper, i.e., rougher paper vibrates more. The measured sympathetic response is then used to select a fuser temperature. However, actual media characteristic parameters are not directly measured on-the-fly. Rather, the roughness of the paper is obtained indirectly from vibration characteristics.

Co-owned U.S. patent application Ser. No. 09/876,507, filed Jun. 6, 2001, entitled METHOD, APPARATUS AND ARTICLE OF MANUFACTURE USING MEDIA ROUGHNESS AS A PRINT PARAMETER, the disclosure of which is hereby incorporated by reference, uses a fresnel lens and reflected light to directly measure the paper roughness. The directly measured paper roughness is then used to select the halftone screen.

Still, the use of other media characterization in setting printing parameters would allow high quality output to be obtained with a larger range of media than can be achieved with static printer parameters. The improvement of printing quality on media outside the "preferred" media types for the printer would provide more consistent and higher-quality overall printing. Additionally, support for a range of media wider than that currently supported would improve customer satisfaction by allowing customers more flexibility and cost savings on media used.

It can be seen then that there is a need for a method, apparatus and article of manufacture for modifying printing based upon direct on-the-fly media characteristic parameters. On-the-fly measurement and modification of parameters is important to print quality because print characteristics can change during the printing of a print job. For example, a parameter such as paper composition or texture can be non-constant through a roll of paper on which the print is marked. Additionally, on-the-fly adjustment reduces required operator interaction for high print quality.

SUMMARY OF THE INVENTION

To overcome the limitations in the prior art described above, and to overcome other limitations that will become apparent upon reading and understanding the present specification, the present invention discloses a method, apparatus and article of manufacture for modifying printing based upon direct on-the-fly media characteristic parameters.

The present invention solves the above-described problems by on-the-fly directly measuring a media characteristic parameter and performing real-time print modification in response thereto.

A method in accordance with the principles of the present invention includes on-the-fly directly measuring at least one print media characteristic parameter and modifying in real-time printing by a print device in response to the on-the-fly directly measured print media characteristic parameters.

In another embodiment of the present invention a print device is provided. The print device includes a marker system for rendering a page layout on a medium and a processing system, coupled to the marker system, the processing system directly measuring at least one print media characteristic parameter on-the-fly and modifying in real-time printing by the print device in response to the at least one on-the-fly directly measured print media characteristic parameter.

In another embodiment of the present invention an article of manufacture including a program storage medium readable by a computer is provided. The medium tangibly embodies one or more programs of instructions executable by the computer to perform a method for modifying printing based upon direct on-the-fly media characteristic parameters, the method comprising on-the-fly directly measuring print media characteristic parameters and modifying in real-time printing in response to the on-the-fly directly measured print media characteristic parameters.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

The present invention provides a method, apparatus and article of manufacture for modifying printing based upon direct on-the-fly media characteristic parameters. Media characteristic parameters are measured directly on-the-fly and real-time print modification is performed in response thereto.

Figure 1:
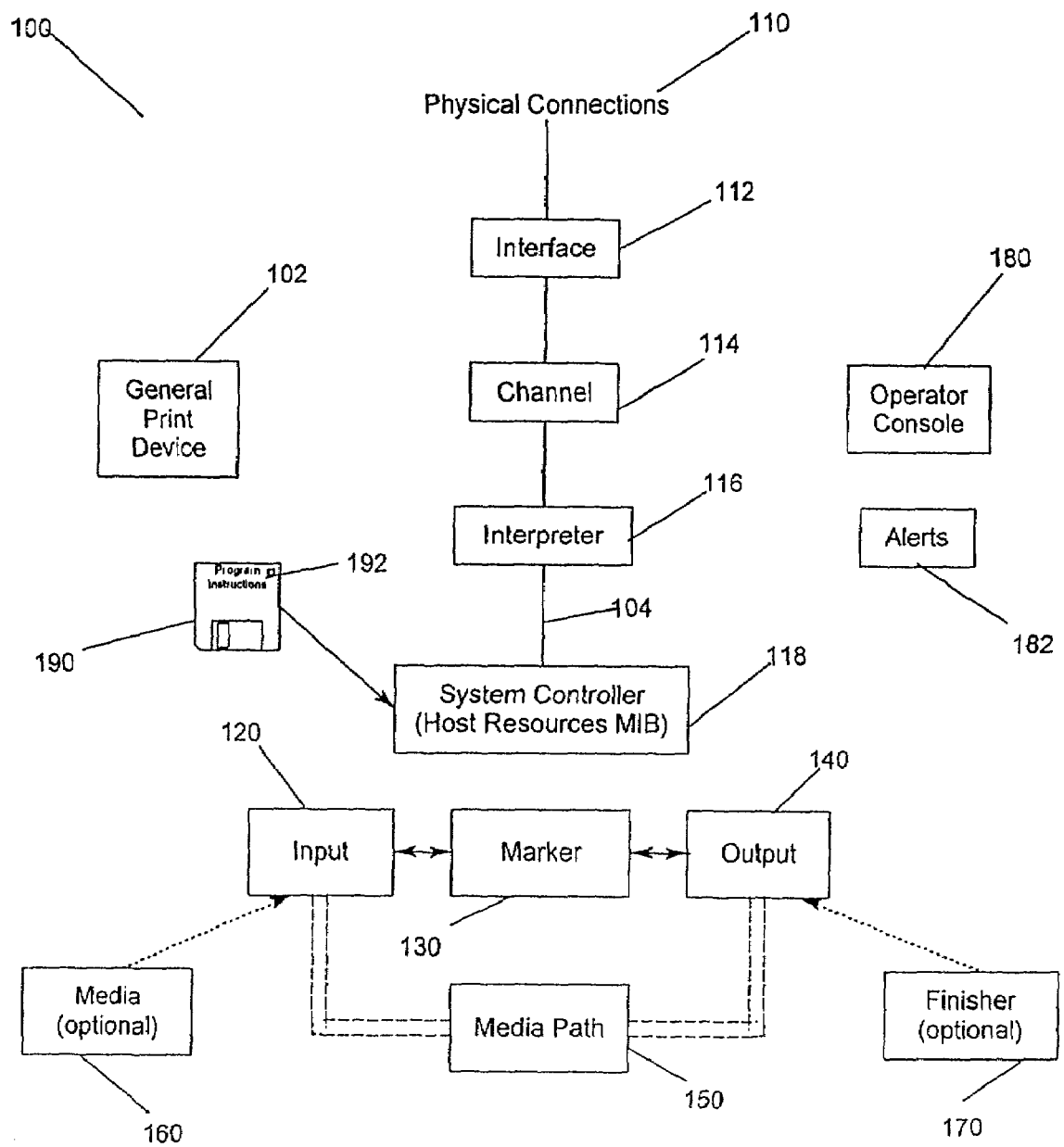
FIG. 1 illustrates a block diagram of a print device according to the present invention.

FIG. 1 illustrates a block diagram of a print device 100, such as a printer or a digital copier, according to the present invention. Those skilled in the art will recognize that the sub-units of the print device illustrated in FIG. 1 may not necessarily relate directly to any physically identifiable mechanism. Sub-units can also be a set of definable logical processes, such as interpreters for page description languages or command processors that set various operating modes of the print device.

FIG. 1 illustrates the three basic functions of the print device: (1) the flow of a print file into an interpreter and onto the marker, (2) the flow of media through the marker and (3) the auxiliary sub-units that control and facilitate the two flows. As shown in FIG. 1, the flow of the print data comes through a physical connection 110 on which some form of transport protocol stack is running to a print device interface 112. The data provided by the transport protocol (interface) appears on a channel 114. The channel 114 provides the data stream to the input of an interpreter 116. The interpreter 116 is responsible for the conversion of a description of intended print instances into images that are to be marked on the media. A print device may have one or more interpreters.

As shown in FIG. 1, the media 160 initially resides in Input sub-units 120 from which the media 160 is selected and then transported via a Media Path 150 first to a Marker 130 and then onto an Output 140 with (optionally) some finishing operations 170 being performed. The Input 120 is a mechanism that feeds media to be marked on into the print device. There may be as many Inputs 120 as there are distinctly selectable input "addresses". The Media 160 is an extension of the Input 120 which represents that media that is in an Input 120. The Output 140 is a mechanism that receives media that has been marked on. A print device may contain one or more Output mechanisms 140. There are as many Outputs 140 as there are distinctly selectable output "addresses". A finisher 170 is a unit that performs some operations on the media other than marking. Some examples of finishing processes are stapling, punching, binding, inserting, or folding. The optional finisher 170 can be used to apply highlight color, an image or MICR (magnetic ink character recognition) ink or toner to the media. The marker 130 would also use the roughness of the media to determine the correct halftoning screen to use with the media.

A Marker 130 is the mechanism that produces marks on the print media. A print device can contain one or more Markers 130. Some examples of multiple marker sub-units 130 are: a print device with separate markers for normal and magnetic ink or an imaging system that can output to both a proofing device and final film. Each Marker 130 can have its own set of characteristics associated with it, such as marking technology and resolution. The media paths 150 encompass the mechanisms in the print device that move the media through the print device and connect all other media related units: Inputs 120, Outputs 140, Markers 130 and Finishers 170. A print device may contain one or more media paths 150. In general, the design of the media paths 150 determines the maximum speed of the print device as well as the maximum media size that the print device can handle. Media paths 150 are complex mechanisms and can contain many different identifiable sub-mechanisms such as media movement devices, media buffers, duplex units and interlocks. Not all of the various sub-mechanisms reside on every media path 150. For example, one media path may provide printing only on one surface of the media (a simplex path) and another media path may have a sub-mechanism that turns the media over and feeds it a second time through the marker sub-unit (a duplex path). The duplex path may even have a buffer sub-mechanism that allows multiple copies of the obverse side to be held before the reverse side of all the copies are marked.

The auxiliary sub-units, such as the General Print Device 102, Operator Console 180 and Alerts 182, facilitate control of the print device, inquiry/control of the operator panel, reporting of alerts, and the adaptation of the print device to various natural languages and characters sets. The General Print Device 102 is responsible for the overall control and status of the print device. The Operator Console 180 is used to display and modify the state of the print device. The console 180 can be as simple as a few indicators and switches or as complicated as full screen displays and keyboards. The Alert unit 182 is responsible for detecting reportable events, making an entry in the alert table and, if and only if, the event is a critical event, initiating a trap. For example, if the correct textured media is not loaded in the print device then this could be communicated back to the host through the bi-directional print data stream 104. In addition to this, an alert via the Alert unit 182 can be used to notify the manager of the printer that the correct media is not loaded in the printing device, or that the media has characteristic parameters that have changed.

All of the above described functions run on the System Controller 118, which represents the processor, memory and storage systems of the print device. The System Controller 118 implements the control functions for processing a print job. The System Controller 118 includes the Management Information Base (MIB), which provides access to data elements of the print device, such as the processor(s), memory, disk storage, file system and other underlying sub-mechanisms of the print device. The System Controller 118 can range from simple single processor systems to multiprocessor systems. In addition, controllers can have a full range of resources such as hard disks. Those skilled in the art will recognize that a print device may have more than one processor and multiple other resources associated with it.

A process for on-the-fly directly measuring a media characteristic parameter and performing real-time print modification in response thereto is performed by the System Controller 118. The process, as will be described below with reference to FIGS. 2–4, may be tangibly embodied in a computer-readable medium or carrier, e.g., one or more of the fixed and/or removable data storage devices 190, or other data storage or data communications devices. The computer program 192 of the storage device 190 may be loaded into System Controller 118 to configure the System Controller 118 for execution. The computer program 192 comprise instructions which, when read and executed by the System Controller 118 causes the System Controller 118 to perform the steps necessary to execute the steps or elements of the present invention.

Figure 2:
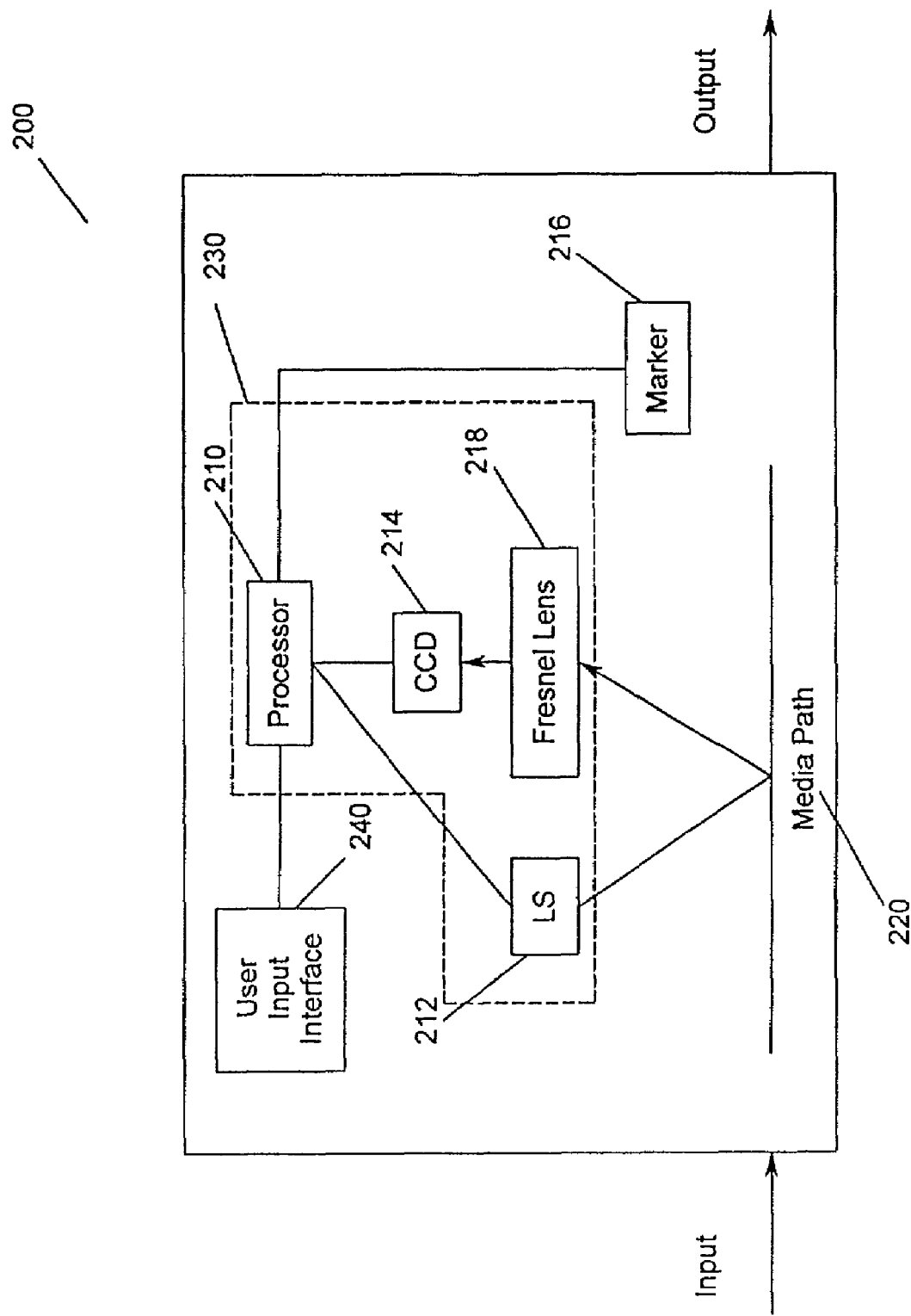
FIG. 2 illustrates a block diagram of a print device having an on-the-fly media characteristic parameter measuring and print modification system according to the present invention.

FIG. 2 illustrates a block diagram of a print device 200 having one embodiment of a media characteristic parameters measuring system according to the present invention. In the embodiment illustrated in FIG. 2, the print device 200 may measure media roughness and includes a controller/processor 210. The processor 210 controls the light source (LS) 212, a device for converting light into proportional (analog) electrical current such as a charged coupled device (CCD) 214 and the marker 216 or other hardware for rendering an electronic image onto some type of output media such as paper. Alternatively, a CMOS camera may be used, and in general a digital camera or any other scanning element, which is capable of transforming light intensity into digital values, may be used. The word "scanner" will be used to include all such camera devices as well as other more traditional one or two-dimensional element scanning arrays. The CCD 214 above the media path 220 measures the light from the light source that is reflected by the media. Smooth media reflects more light and therefore the CCD 214 generates a signal that is proportional to the amount of reflected light. Rough media will reflect less light. The sensitivity of the CCD 214 provides for an output signal that represents a wide spectrum of media smoothness.

A fresnel lens 218 is used to gather together the rays of light coming from a source and direct them into a narrow beam. Thus, the fresnel lens 218 inserted in front of the CCD prevents dispersed light from being measured. Since rough media disperses the light at many different angles, the amount of light received back in nearly parallel rays is an indication of its smoothness. Off white or colored media could be compensated for by a form description entered by the operator describing its color. In fact on a print device color display, examples of different shades of colored media could be displayed. Then the operator would simply select the color that most closely matches the actual media color. The smoothness could then be automatically measured, taking into account any effect the color of the media could be expected to have on the reflected light measurement.

The smoothness processing system 230, which may be formed, for example, by processor 210, light source 212, CCD 214 and fresnel lens 218, is just one way of determining the roughness of the media. Alternatively, a user of the print device 200 may select the quality of the media needed for his application manually using a user input interface 240. Using the user input interface 240, the user may simply select a media smoothness for media being used by the print device. If only the manual method is used, obviously the LS 212, CCD 214 and fresnel lens 218 are not needed. Both manual and automatic media roughness selection provide the benefits of the best possible screening algorithm to match the particular media chosen. Those skilled in the art will recognize that the automation of measuring smoothness of the media does not have to be implemented for the basic idea of utilizing the media roughness information to generate better output such as by selecting the screening algorithm to work best with the given media roughness. The media roughness print parameter can also be entered remotely and then be stored with a particular job. The parameter can then come down the print stream to processor 210 of the print device 200 in a job ticket. Accordingly, the parameter in the job ticket may indicate to the processor 210 that the current print job is for an important customer that requires the smoothest media, or the parameter may indicate to the processor 210 that rough media is to be used, for example, for greeting cards or stationary.

The processor 210, through data supplied by the user via the user input interface or via an electrical signal from the CCD representing the roughness of the media, selects an optimum halftone screen for the level of media roughness. Media roughness values may be included in the forms definitions to make possible quick selection of the optimal halftone screens by the processor 210. Accordingly, better print quality is provided using less expensive media. Moreover, marketing departments are better able to justify the print device costs based on the savings in media costs for the desired quality.

Figure 3:
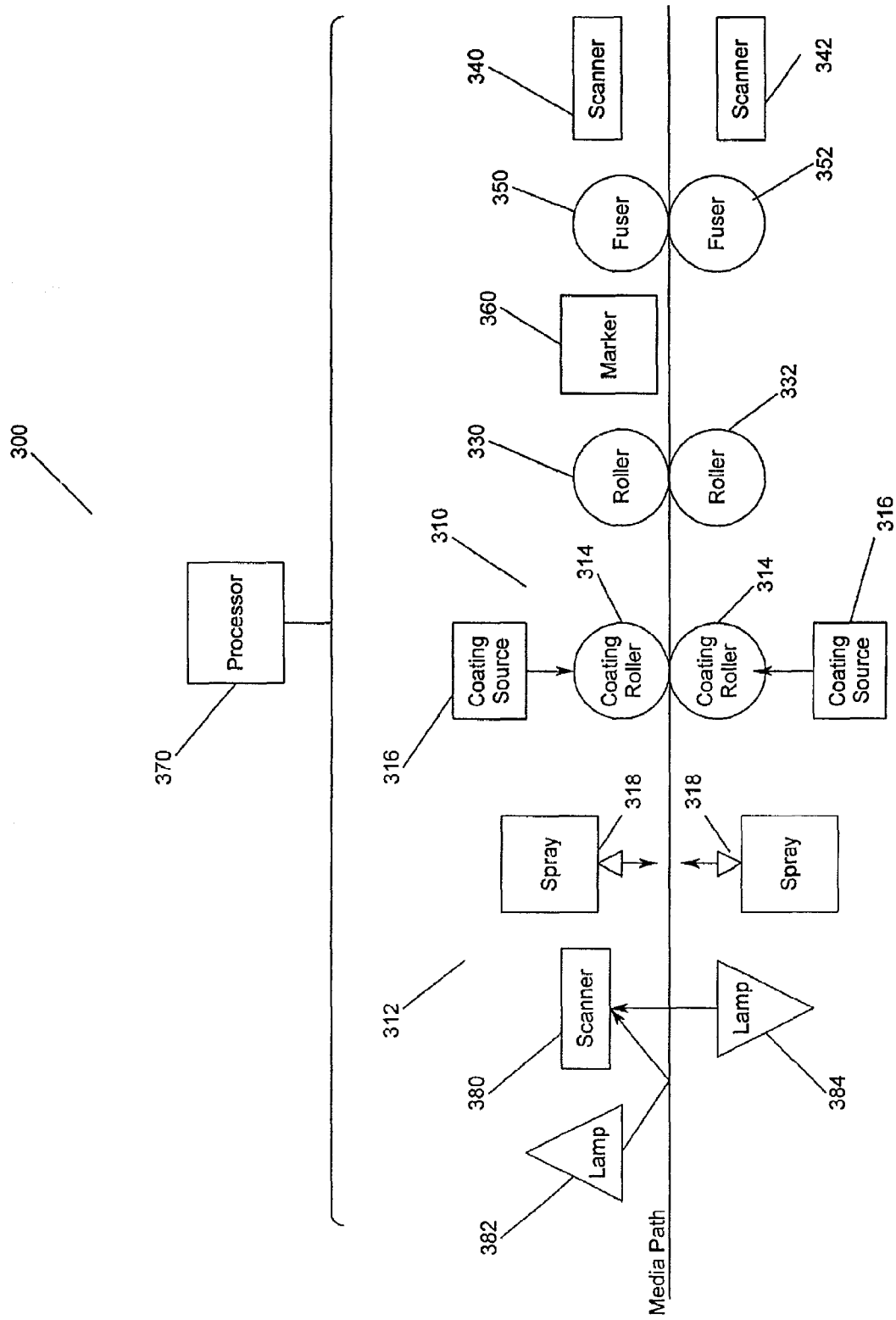
FIG. 3 illustrates a block diagram of a print device for modifying printing based upon direct on-the-fly media characteristic parameters according to the present invention.

FIG. 3 illustrates a block diagram 300 of a print device for modifying printing based upon direct on-the-fly media characteristic parameters according to the present invention. In FIG. 3, the print device includes surface coating elements 310, 312. The surface coating elements may apply a surface coating on the media before printing. Surface coatings are typically starch, rosin, or another appropriate coating to which the toner can properly adhere. As shown in FIG. 3, the surface coating elements include coating rollers 314 for applying a coating supplied to the coating rollers by a coating source 316 to at least one side of the media. In addition, or alternatively, a sprayer 318 may spray the coating on the media. The sprayers 318 and coating rollers 314 may be disposed on only one side of the media, or may be disposed on both sides of the media.

FIG. 3 also shows hot rollers 330, 332 that may hot roll the media before printing. The media may be moved through a pair of rollers 330, 332 where one or both may be heated, to flatten and dry the media. The media may be hot rolled after the application of a coating (via rolling 310, spraying 312, etc.) to cure the coating and to promote the flattening of rough media fibers. In addition, or alternatively, hot rollers 330, 332 may be used prior to application of the coating to lower the moisture content of the media thereby improving coating coverage and adhesion.

In FIG. 3, the quality of adhesion to the media may be measured by scanners 340, 342 during printer alignment and threading. For example, a test pattern may be printed on the media, fused, and recorded by one or two scanners 340, 342 at the output of the fuser 350, 352. A first CCD camera 340 may be used to measure the printed side of the media, and if a second CCD camera 342 is used, it will measure the unprinted side of the media or the other printed side of the media.

In a laser printer embodiment, wherein a marker (i.e., a printing device) applies marking to the media, e.g., toner, media with long, smooth fibers (e.g., the eucalyptus papers of east Asia) or undesirable coating that inhibits adhesion will suffer toner removal at the hot roll. Toner removal may be recorded by scanners 340, 342. Such media will require a starch or rosin-type coating to promote adhesion. Accordingly, the detection of hot roll toner removal at the scanners 340, 342 can trigger the processor 370 to initiate the coating process. An alignment patch may even be re-run to verify the print quality improvement achieved with the coating.

The marker 360 is controlled by a processor 370 to render an electronic image onto some type of output media, such as paper. Such images are often rendered using halftoning algorithms. According to the present invention, halftoning algorithms implemented by the processor 370 and marker 360 may be adjusted for media surface and absorption characteristics, where dot gain may be exploited in media types that promote dot gain. For example, papers showing spatially varying dot gain, that may be seen with inconsistent or very rough papers, can have halftone screens implemented by the processor 370 and marker 360 adjusted accordingly to improve print quality. Media showing excessive dot gain, or thin media experiencing "bleed through", may have either halftone screens or toner concentration algorithm implemented by the marker adjusted for lighter print.

A scanner 380 may be included to detect mottle effects in the media. Mottle in the media affects the quality of the print, and can result in print mottle, reducing print quality in Electrophotographic (EP) and inkjet printers. Utilizing low-cost polymer substrate scanners 380, or similar low-cost device, an array (1-D or 2-D) of scanning elements is placed early in the media path. A 1-D array will be less expensive, as well as decreasing the cost of the light source 382, 384 required. A flash lamp 384 behind the media may be used to illuminate the media from behind, and the resulting transmitted image is collected by the scanning element 380. Alternatively, a top lamp 382 may be used to gather reflected light, or a combination of the two 382, 384 may be used.

Patterns of light and dark will be read by the scanner 380 from the mottle in the media. The light differentials across the transmitted pattern allow the measurement of the severity of media mottle and its spatial pattern in that local region. The scanners 380 will be able to operate at the frequencies required. This information may be fed, as a lookup table or a parameter adjustment in real time, into the print quality enhancement (PQE) algorithm that is implemented in the processor 370 to adjust the PQE algorithm in local regions across the media to compensate for mottle. Alternatively, if hardware screening is performed in real time, the local mottle information can be used to adjust the screening algorithm applied by the processor 370 and marker 360 locally for mottle in real time.

In addition, the results of mottle measured by scanner 380 can be used to drive the local coating system, e.g., in a region where the media is very thin, coating may be applied thicker than in other regions where the media is thicker. This will be most critical to inkjet printing where bleedthrough is a problem. The local change of coating may be able to save coating material, and thus cost, by using the coating where it is needed most.

Transmitted or reflected light from the media, as measured by the scanner 380, can also reveal the directions of long fibers in the media. Normally during the media manufacturing process, the long fibers are aligned along the process direction for strength. However, in low-cost or recycled media, the fibers may be less well behaved. In this case, knowing the fiber directions in the media may be used to change the screening angles applied by the processor 370 and marker 360 in a page to best suit the average overall fiber directions in the page, which may improve the print quality by preventing screen interaction with long fibers. This method may be used in single color, highlight, and process color printing process.

Figure 4:
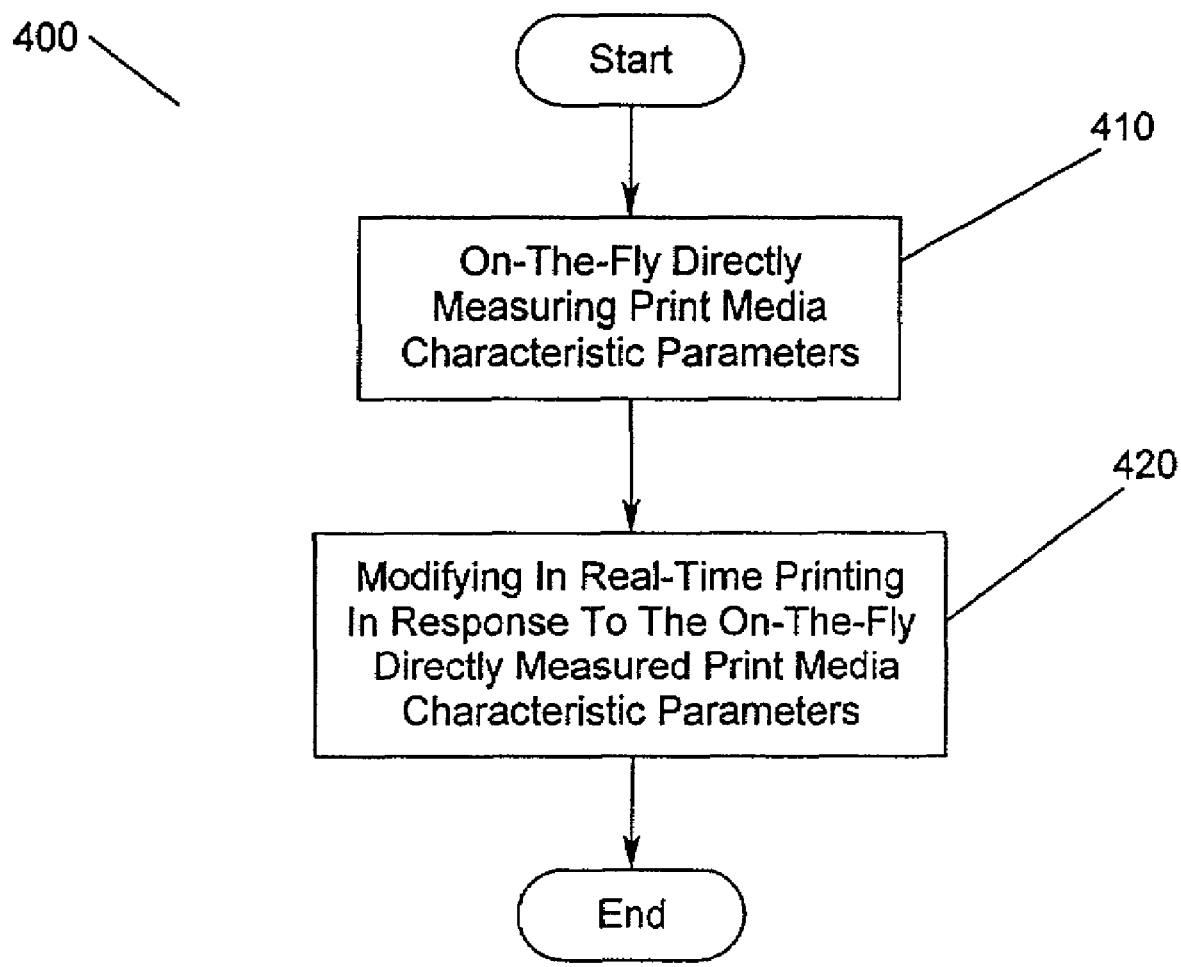
FIG. 4 illustrates a flow chart of the method for modifying printing based upon direct on-the-fly media characteristic parameters according to the present invention.

FIG. 4 illustrates a flow chart 400 of the method for modifying printing based upon direct on-the-fly media characteristic parameters according to the present invention. Print media characteristic parameters are measured on-the-fly 410. Then, printing is modified in real-time in response to the on-the-fly directly measured print media characteristic parameters 420. The modifications, as described above, may include application of a coating, hot rolling, scan and measurement by a scanner at the output of the fuser, halftoning algorithm adjustment by the processor and marker and adjusting toner concentration when the print quality is poor.

Accordingly, the present invention provides a method, apparatus and article of manufacture for modifying printing based upon direct on-the-fly media characteristic parameters. Media characteristic parameters are measured directly on-the-fly and real-time print modification is performed in response thereto. However, those skilled in the art will recognize that the present invention is not meant to be limited to a print device that uses all of the above-described features. Rather, any combination of the above-described features may be implemented to provide a print device for modifying printing based upon direct on-the-fly media characteristic parameters. Additionally, other parameters might be measured on-the-fly for the adjustment of print without departing from the spirit of this invention. The parameters mentioned above have been listed as examples of parameters relevant to electrophotographic and inkjet print systems where the customer is sensitive to paper cost.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for modifying printing based upon direct on-the-fly media characteristic parameters, comprising:
    on-the-fly directly measuring at least one physical characteristic parameter of the print media;
    in real-time performing a print modification to a print device for printing on the measured print media in response to the at least one on-the-fly directly measured physical characteristic parameter of the print media; and
    hot rolling the media before printing, wherein the hot rolling is implemented prior to the application of a coating to lower the moisture content of the media, the lowering of the moisture content improving coating coverage and adhesion.

2. The method of claim 1 wherein the on-the-fly directly measuring comprises scanning the media with a scanner.

3. The method of claim 2 wherein the scanner is a CCD camera.

4. The method of claim 2 wherein the scanner is used to determine whether toner is properly adhering to the media.

5. The method of claim 4 wherein the scanner is a CCD camera.

6. The method of claim 1 further comprising applying a surface coating on the media before printing.

7. The method of claim 6 wherein the surface coating is applied to only one side of the media.

8. The method of claim 6 wherein the surface coating is applied to both sides of the media.

9. The method of claim 1 wherein the hot rolling comprises flattening rough fibers and drying the media.

10. The method of claim 1 wherein the hot rolling is implemented after the application of a coating to cure the coating.

11. The method of claim 1 wherein the on-the-fly directly measuring further comprises measuring a quality of print for the media.

12. The method of claim 11 wherein the quality of print comprises print marking adhesion.

13. The method of claim 12 wherein the print marking is toner.

14. The method of claim 12 further comprising applying a coating to promote adhesion when the print marking adhesion is poor.

15. The method of claim 11 wherein measuring comprises detecting the quality of print using at least one scanner.

16. The method of claim 15 wherein the scanner is a CCD camera.

17. The method of claim 1 wherein the performing a print modification further comprises adjusting halftone screens for measured media surface and absorption characteristics.

18. The method of claim 17 wherein the halftone screens are adjusted for spatially varying dot gain.

19. The method of claim 17 wherein the halftone screens are adjusted for excessive dot gain.

20. The method of claim 17 wherein the halftone screens are adjusted to prevent bleed through for thin media.

21. The method of claim 1 wherein the measuring comprises detecting print quality and the performing a print modification further comprises adjusting toner concentration when the print quality is poor.

22. The method of claim 1 wherein the measuring further comprises measuring mottle effects in the printed media.

23. The method of claim 22 wherein a scanning element is used to detect the mottle effects.

24. The method of claim 23 wherein the scanner comprises an array of scanning elements placed early in the media path.

25. The method of claim 24 wherein the array is a one dimensional array.

26. The method of claim 24 wherein the array is a two dimensional array.

27. The method of claim 1 wherein the measuring further comprises illuminating the media from behind using a bottom light source and collecting a resulting transmitted image using scanning elements.

28. The method of claim 1 wherein the measuring further comprises reflecting light off of the media using a top light source.

29. The method of claim 1 wherein the measuring further comprises illuminating the media from behind using a bottom light source and collecting a resulting transmitted image using scanning elements and reflecting light off of the media using a top light source.

30. The method of claim 1 wherein the performing a print modification comprises adjusting a print algorithm.

31. The method of claim 30 where the print algorithm is adjusted to compensate for mottle in the media.

32. The method of claim 30 wherein the detection of mottle in the media drives a local coating system for selectively applying a coating on the media.

33. The method of claim 1 wherein the print device is a printer.

34. The method of claim 1 wherein the print device is a digital copier.

35. A print device, comprising:
    a marker system for rendering a page layout on a medium;
    a processing system, coupled to the marker system, the processing system directly measuring on-the-fly at least one physical characteristic parameter of the print media and in real-time performing a print modification to the print device for printing on the measured print media in response to the at least one on-the-fly directly measured physical characteristic parameter of the print media; and
    hot rollers, the processor using the hot rollers to hot roll the media before printing, wherein the hot rollers are used for hot rolling prior to the application of a coating to lower the moisture content of the media, the lowering of the moisture content improving coating coverage and adhesion.

36. The print device of claim 35 wherein at least one scanner provides measurements of the at least one print media characteristic parameter.

37. The print device of claim 36 wherein the scanner is used to determine whether toner is properly adhering to the media.

38. The print device of claim 35 further comprising a coating applicator coupled to the processor, the processor using the coating application to apply a surface coating on the media before printing.

39. The print device of claim 38 wherein the coating applicator applies a coating to only one side of the media.

40. The print device of claim 38 wherein the coating applicator applies a coating to both sides of the media.

41. The print device of claim 35 wherein the hot rollers flatten rough fibers and dry the media.

42. The print device of claim 35 wherein the hot rollers are used for hot rolling the media after the application of a coating to cure the coating.

43. The print device of claim 35 further comprising at least one scanner for measuring a quality of print for the media.

44. The print device of claim 43 wherein the quality of print comprises print marking adhesion.

45. The print device of claim 44 wherein the print marking is toner.

46. The print device of claim 43 further comprising a coating applicator, the processor using the coating applicator to apply a coating to promote adhesion when the print marking adhesion is poor.

47. The print device of claim 35 wherein the marker adjusts halftone screens for media surface and absorption characteristics.

48. The print device of claim 35 wherein the marker adjusts halftone screens for spatially varying dot gain.

49. The print device of claim 35 wherein the marker adjusts halftone screens for excessive dot gain.

50. The print device of claim 35 wherein the marker adjusts halftone screens to prevent bleed through for thin media.

51. The print device of claim 35 further comprising at least one scanner for detecting a print quality, wherein, the processor adjusts a toner concentration when the print quality is poor.

52. The print device of claim 35 further comprising a scanner to detect mottle effects.

53. The print device of claim 52 wherein the scanner comprises an array of scanning elements placed early in the media path.

54. The print device of claim 53 wherein the array is a one dimensional array.

55. The print device of claim 53 wherein the array is a two dimensional array.

56. The print device of claim 35 further comprising a bottom light source for illuminating the media from behind and a scanner for collecting a resulting transmitted image.

57. The print device of claim 35 further comprises a top light source for reflecting light off of the media.

58. The print device of claim 35 further comprising a bottom light source for illuminating the media from behind and scanner for collecting a resulting transmitted image and a top light source for reflecting light off of the media.

59. The print device of claim 35 wherein scanner provides the processor a control signal to adjust a print quality measurement algorithm.

60. The print device of claim 59 where the print algorithm is adjusted to compensate for mottle in the media.

61. The print device of claim 59 wherein the processor upon receiving a signal indicating mottle in the media drives a local coating system for selectively applying a coating on the media.

62. The device of claim 35 wherein the device is a printer.

63. The device of claim 35 wherein the device is a digital copier.

* * * * *